L. MITCHELL-HENRY.
LINK FOR FISHING AND OTHER TACKLE.
APPLICATION FILED OCT. 13, 1914.

1,159,325.

Patented Nov. 2, 1915.

UNITED STATES PATENT OFFICE.

LORENZO MITCHELL-HENRY, OF NEW YORK, N. Y.

LINK FOR FISHING AND OTHER TACKLE.

1,159,325.      Specification of Letters Patent.      Patented Nov. 2, 1915.

Application filed October 13, 1914. Serial No. 866,423.

*To all whom it may concern:*

Be it known that I, LORENZO MITCHELL-HENRY, a subject of the King of Great Britain, and resident of Hotel Seville, in the city of New York, State of New York, in the United States of America, have invented certain new and useful Improvements in Links for Fishing and other Tackle; and I do hereby declare that the following is a full, clear, and exact description of the same.

The invention relates to improvements in links for fishing or other tackle, as described in the present specification and illustrated in the accompanying drawings that form part of the same.

The invention consists essentially in the novel formation of a piece of wire, whereby the pulling strain is distributed in such a manner as to minimize the effect on that part where the link is opened.

The objects of the invention are to devise a link that will facilitate replacing the leader or cast, where it or the bait or hook has been destroyed or injured, to furnish a connecting part in a length of fishing line and leader that will be simple to operate and of a very durable nature, and generally to provide in fishing or other tackle a new part that will insure great strength in the connecting parts and prove a convenience to the fisherman so that no time is lost whatsoever in changing leaders in order to keep the line almost constantly in the water notwithstanding that one or more leaders may be lost.

Figure 2:
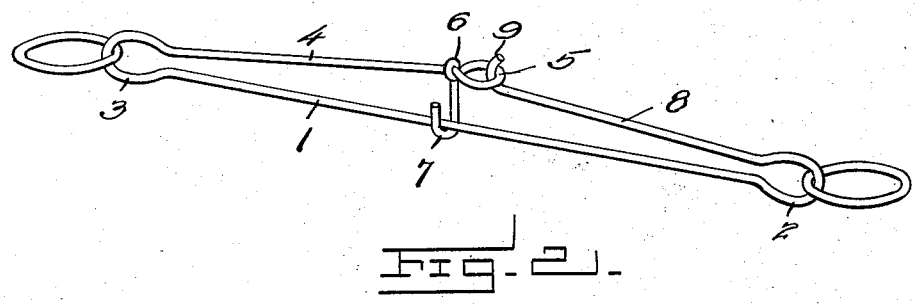
Figure 1:
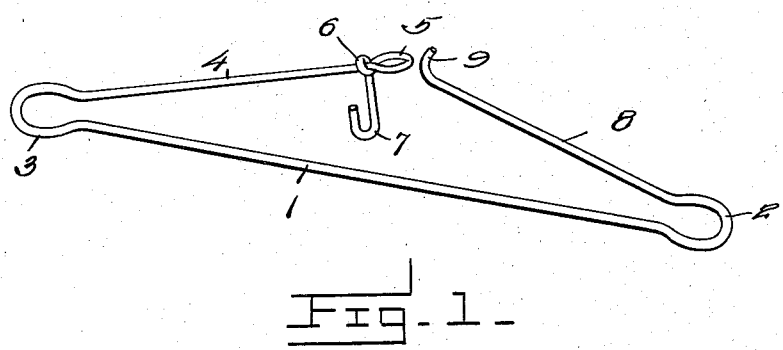

In the drawings, Figure 1 is a perspective view of the link showing it open. Fig. 2 is a perspective view of the link closed.

Like numerals of reference indicate corresponding parts in each figure.

Referring to the drawings, 1 is the long length of the link extending between the end loops 2 and 3, said loops forming the eyes for connecting the fishing line or swivels with the leader. From the loop 3 the short length 4 extends backwardly and at the end forms the eye 5. The end of the said length is left long enough and is twisted around said length 4 at 6 and formed into a hook 7 to engage the long length 1 and 4 cannot spring outwardly from said length 1, furthermore closing that end of the link and confining the swivel or the end of the line in the loop 3 during the operation of fishing.

8 is a short length extending inwardly from the loop 2 and terminating in the hook 9, said hook 9 being adapted to snap into the eye 5 and join the two short lengths 4 and 8, thus closing the link though previous to snapping the hook 9 into the eye 5 the swivel eye or loop of the leader is hooked into the loop 2, then the short length is closed and the line and leader are joined. This may be done with great ease at any time, so that the leader may be changed in a few seconds and the line made ready again to use. This is very important in many kinds of fishing, but particularly in the sport of angling for large fish in the ocean, such as tuna or tarpon, which come in schools, and where the leader or the hook breaks or even when necessary to change the bait, by this means it is possible to have several spare leaders which by this device can be attached almost instantly to the line.

It is of course not entirely unknown to have links for this purpose, but links such as are used on occasions usually lack the factor of safety during the act of playing a fish, as frequently they loosen, pull out, break or unfasten, and therefore as a general rule can only be used for light fish, but in this link the strain of the pull is well distributed.

The exact construction of this link has been explained in detail hereinbefore, but it is obvious that any changes may be made with regard to the loops, the eyes and the hooks, though the mean features will remain, therefore without departing from the spirit of this invention the construction may be altered at will, so long as it is kept within the scope of the claims for novelty following, and it may be further said in this connection that while it has been pointed out in this description that the link is used for fishing tackle it has many other uses.

Further it may be said that while there are other uses that this invention may be put to, it is not intended that it shall be used other than as a link connecting two line ends of any description, in such a way as to be separated without delay and connected up quickly, the joint being quite as strong as the line itself if not of greater strength.

What I claim is:

1. A link adapted to engage two line ends comprising a length of wire having the end portions bent inwardly forming open eyes for attaching the lines, said end portions terminating one in a hook and the other in an eye, engaged by said hook, and a hook engaging the adjacent central portion of the wire.

2. A link adapted to engage two line ends comprising a length of wire having the end portions bent inwardly forming loops for attaching the lines, said end portions meeting intermediate of the length of the central portion and being joined together by hook and eye and connected to said central portion.

Signed at Montreal Canada this 2nd day of October 1914.

LORENZO MITCHELL-HENRY.

Witnesses:
M. McCallum,
V. I. Fetherstonhaugh.